(12) United States Patent
Hallak

(10) Patent No.: US 8,464,318 B1
(45) Date of Patent: Jun. 11, 2013

(54) SYSTEM AND METHOD FOR PROTECTING WEB CLIENTS AND WEB-BASED APPLICATIONS

(75) Inventor: Renen Hallak, Beit Yehoshua (IL)

(73) Assignee: Renen Hallak, Beit Yehoshua (IL)

( * ) Notice: Subject to any disclaimer, the term of this patent is extended or adjusted under 35 U.S.C. 154(b) by 273 days.

(21) Appl. No.: 12/623,962

(22) Filed: Nov. 23, 2009

Related U.S. Application Data

(60) Provisional application No. 61/117,487, filed on Nov. 24, 2008.

(51) Int. Cl.
*G06F 7/04* (2006.01)

(52) U.S. Cl.
USPC .............................................................. 726/4

(58) Field of Classification Search
None
See application file for complete search history.

(56) References Cited

U.S. PATENT DOCUMENTS

| | | | | |
|---|---|---|---|---|
| 6,584,569 | B2 * | 6/2003 | Reshef et al. | 726/25 |
| 2008/0320567 | A1 * | 12/2008 | Shulman et al. | 726/4 |
| 2009/0077670 | A1 * | 3/2009 | Schireson | 726/27 |
| 2009/0300111 | A1 * | 12/2009 | Rana | 709/203 |

* cited by examiner

*Primary Examiner* — Fikremariam A Yalew
(74) *Attorney, Agent, or Firm* — Myers Wolin, LLC

(57) ABSTRACT

A method for securing a web client against malicious web attacks, the method is performed by a secure gateway deployed between a web client and a web server. The method comprises receiving a uniform resource locator (URL) request from the web client; sending the URL request to the web server for executing server side web application code responsive to the URL request; receiving client side application code from the web server; executing the client side application code on behalf of the web client; and sending the web client user interface updates rendered responsive to the execution of the client side application code.

15 Claims, 11 Drawing Sheets

SYSTEM AND METHOD FOR PROTECTING WEB CLIENTS AND WEB-BASED APPLICATIONS

CROSS REFERENCE TO RELATED APPLICATIONS

This application claims the benefit of U.S. provisional Application No. 61/117,487 filed on Nov. 24, 2008, the contents of which are herein incorporated by reference.

TECHNICAL FIELD

The present invention relates to computer application security systems, and more particularly to systems and methods for protecting web clients and web-based applications.

BACKGROUND OF THE INVENTION

It has become commonly accepted that network level firewalls and intrusion prevention systems (IPS) are inadequate in the protection of application threats and vulnerabilities. Web application firewalls (WAFs) are designed to operate at the application layer and to inspect ongoing traffic. WAFs have been employed to overcome web application vulnerabilities, such as parameter manipulation, structured query language (SQL) injection, cookie poisoning, and so on.

Currently available WAFs must differentiate between legal and illegal traffic, in order to decide which sessions to block. With this aim, a WAF should know the behavior of the application it must protect; a behavior of an application is adaptively learned through an analysis of representative traffic. However, an adaptive learning approach has been proven to be always prone to false positives (i.e., legal behavior is tagged as illegal) and false negatives (i.e., illegal behavior is tagged as legal). As a result, the adaptive learning is often used alongside black lists, i.e., the blocking of previously detected attacks by means of "attack signatures". Nevertheless, signature-based detection cannot handle zero-day-attacks or many malicious attacks initiated through legitimate actions (e.g., a bank manager authorizing a loan versus a customer authorizing that same loan).

FIG. 1 depicts a typical computing environment for execution of a web application by a web client 110 and a web server 120 connected over a network. A web session typically consists of a web client 110 and server 120, communicating, for example, over HTTP or HTTPS. The client 110 sends HTTP messages consisting of requested URLs. The server 120 responds to HTTP messages with client side application code which is generally in the form of HTML pages, JavaScripts, and cascading style sheets (CSS). The client side application code typically includes both display information and executable code, and may be self triggered or activated by a user. The execution of the client side application code by the client 110 generates HTTP messages sent back to the server 120. The payload of these messages may include parameters to be received and processed by server side application code.

In the environment illustrated in FIG. 1, both the client 110 and server 120 are vulnerable to harmful attacks. The client 110 is vulnerable as it executes software code received from an un-trusted server 120. The server 120 is vulnerable as it processes un-validated requests and parameters (which may also include software code) from un-trusted clients (e.g., client 110). The attacks may include, for example, the infestation of client machines with malware and/or spyware, phishing attacks used for identity theft and data theft, and so on.

Currently available secure web gateways (SWGs) protect clients from web based attacks by using various methods for detecting and blocking out malicious web attacks. These methods include signature-based detection, URL filtering methods, and static code analysis. All of these methods need previous knowledge of attacks or attack templates and have proven to be quite ineffective in the dynamic environment of the Internet.

Therefore, it would be advantageous to provide a solution that would cure the deficiencies of existing web applications security solutions.

SUMMARY OF THE INVENTION

Certain embodiments of the invention includes a method for securing a web client against malicious web attacks, the method is performed by a secure gateway deployed between a web client and a web server. The method comprises receiving a uniform resource locator (URL) request from the web client; sending the URL request to the web server for executing server side web application code responsive to the URL request; receiving client side application code from the web server; executing the client side application code on behalf of the web client; and sending the web client user interface updates rendered responsive to the execution of the client side application code.

Certain embodiments of the invention further includes a secure gateway for securing a web client against malicious web attacks, the secure gateway is deployed between a web client and a web server. The secure gateway further comprises at least one client zone for executing client application side code of a web application on behalf of the web client; wherein the at least one client zone includes an execution component and a cookies manager.

Certain embodiments of the invention also include a web virtualization engine for remotely executing web applications. The web virtualization engine further comprises an execution component for executing client application side code of a web application on behalf of a web client, wherein the execution component is operable in a secure gateway deployed between the web client and a web server; and a user interface component for generating user interface content for the web client based on user interface updates received from the execution component, wherein the user interface component is operable in the web client.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
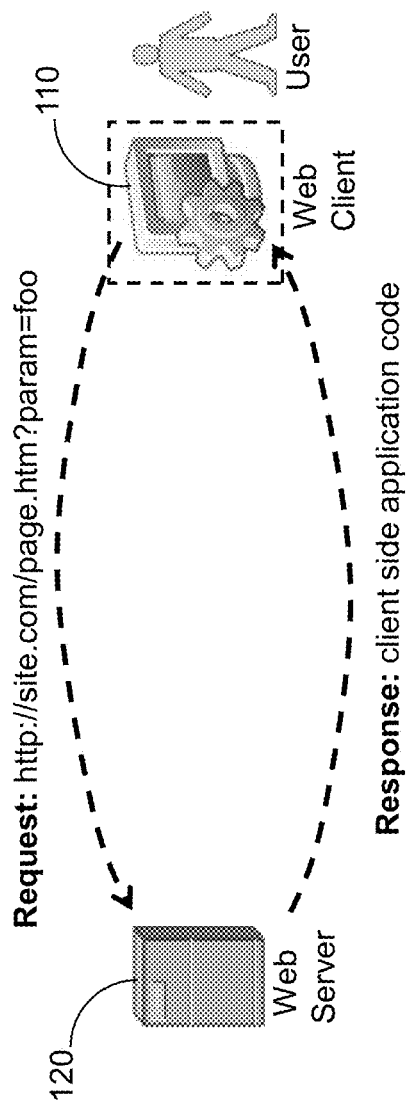
FIG. 1 is a diagram illustrating the current web application environment.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2A:
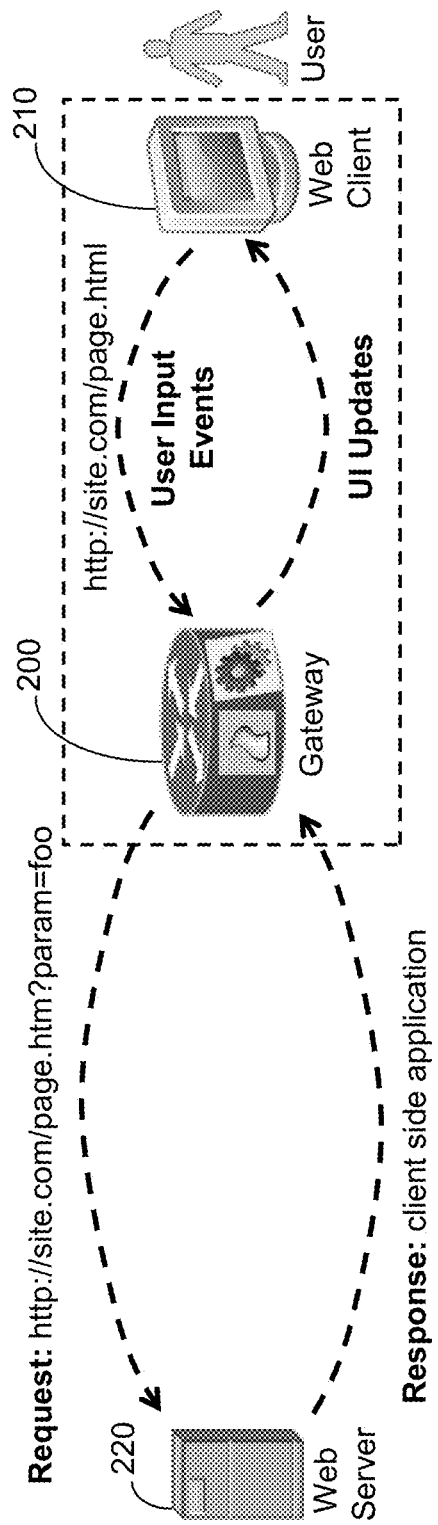
FIGS. 2A through 2G are diagrams illustrating various deployment options of a secure gateway provided in accordance with an embodiment of the invention.
Figure 2B:
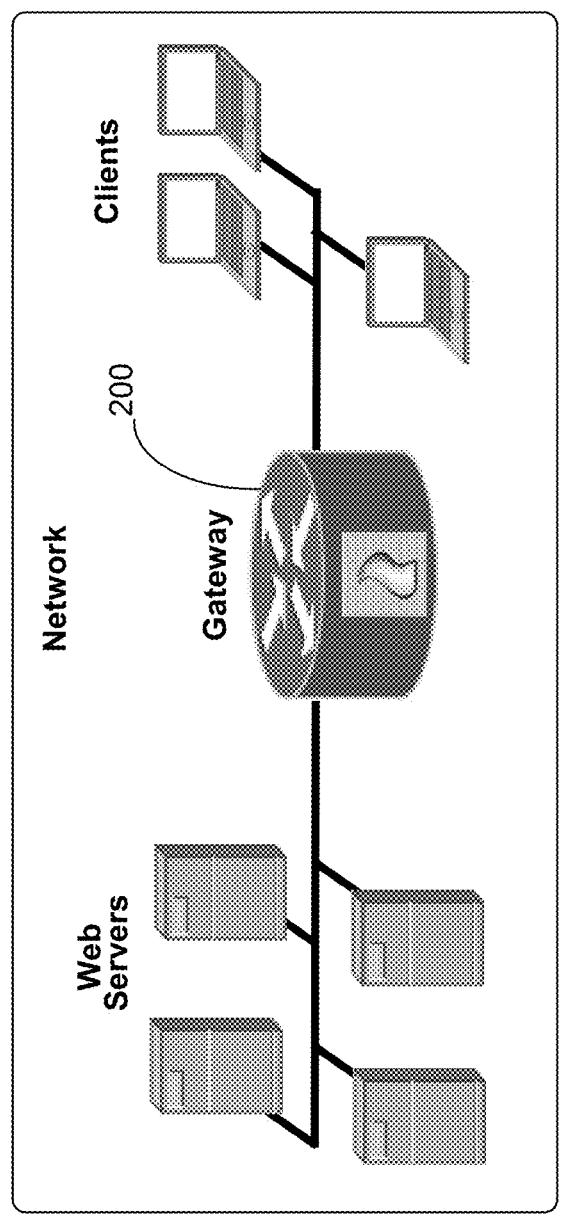
Figure 2C:
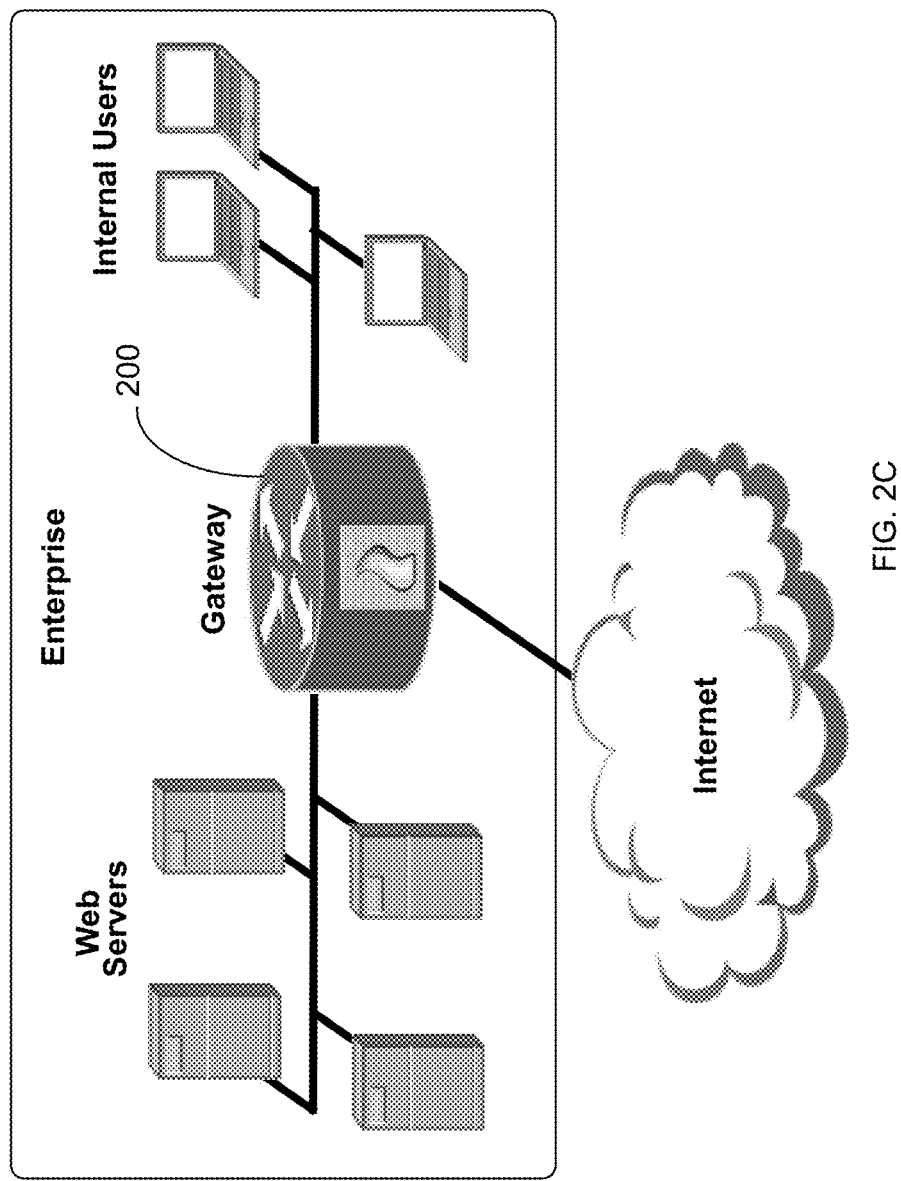
Figure 2D:
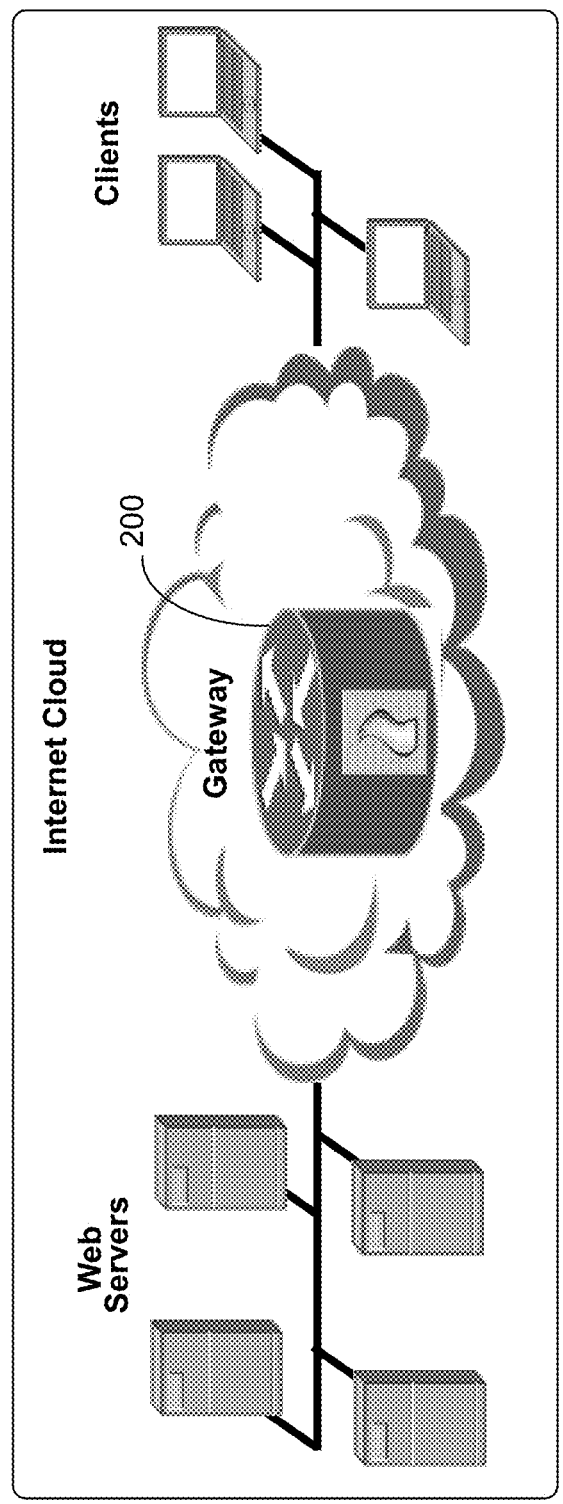

FIG. 2A illustrates a deployment of a secure gateway 200 in a web application environment. The secure gateway 200 implements a web application firewall (WAF) and/or secure web gateway (SWG) by performing all client side execution of the web application on the secure gateway 200 on behalf of the web client 210. Only a subset of the original client side application, generated in real time by the secure gateway 200, is sent to the web client 210. This subset may include, but is not limited to, parts mandatory for user input and output (the user interface). All client side processing (e.g., JavaScript execution, cookie manipulation, etc.) are performed on the trusted and sealed secure gateway 200. Furthermore, within the secure gateway 200 the client code is typically executed in a "sandbox" to secure the gateway.

It should be appreciated that executing client side application code of a web application by the secure gateway 200 (instead of by the client itself) provides protection against harmful attacks, thereby protecting the client 210. Furthermore, the web application and server 220 have the assurance that the client side application code has not been tampered with, and are thus also protected by the secure gateway 200. In certain exemplary embodiments the secure gateway 200 may include a selection engine that selects (harmless) parts of code to be sent to clients. This ensures lower latency as well as better responsiveness and interactivity to web applications.

The client side application code is an executable code (e.g., a script) that is generated by the web server 220 responsive to the functionality of the web application. Traditionally, the client side application code is processed by the client 220. However, in accordance with the present invention the execution of client side application code is separated between the gateway 200 and client 210. As a result, the inherently insecure protocols of the Internet are now limited to run in a secure environment between the server 220 and the gateway 200. In an "un-trusted zone" between the gateway 200 and client 210, a secure gateway-client protocol is utilized. This protocol uses harmless HTML constructs and accepts a limited set of user events. In addition, the principle of least privilege is enforced to protect the server 220 by allowing users to perform actions authorized by the user interface of the client 210.

FIG. 2A provides only one example for deploying the secure gateway 200 in a network to protect web applications. Other deployment options would be apparent to one with ordinary skill in the art, some of which are illustrated in FIGS. 2B through 2G. In the network shown in FIG. 2B, a single gateway 200 mediates between multiple clients and servers. In the network illustrated in FIG. 2C, internal users of an enterprise are protected from external attacks when surfing the Internet and when using web applications on the enterprise's web servers. The enterprise's web applications are also protected from both internal and external attacks. In the network shown in FIG. 2D, gateway 200 is a network device installed in a wide area network (WAN) and offers protection services to both web clients and web servers who have their traffic pass through the gateway 200.

Figure 2E:
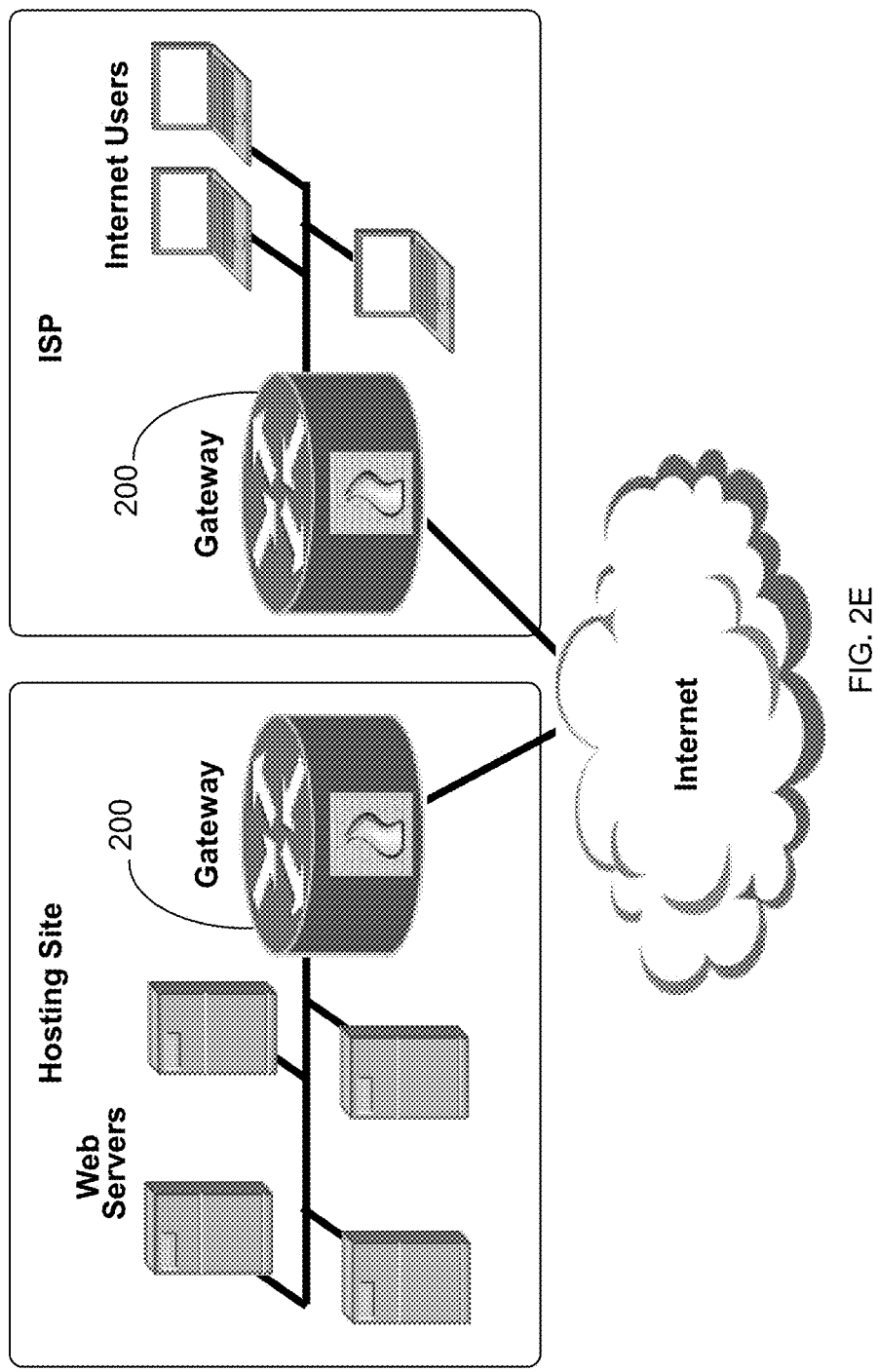

In the network deployment depicted in FIG. 2E, the gateway 200 may include the implementation of the selection engine discussed above. Such deployment may be suitable for internet service providers (ISPs) that by locating the secure gateway 200 in a position such that the clients' web traffic passes through it can provide "secure surfing" services. Alternatively or collectively, a hosting site may offer its customers a "secure hosting" service, and locate the gateway 200 between the web servers and its Internet connection.

Figure 2F:
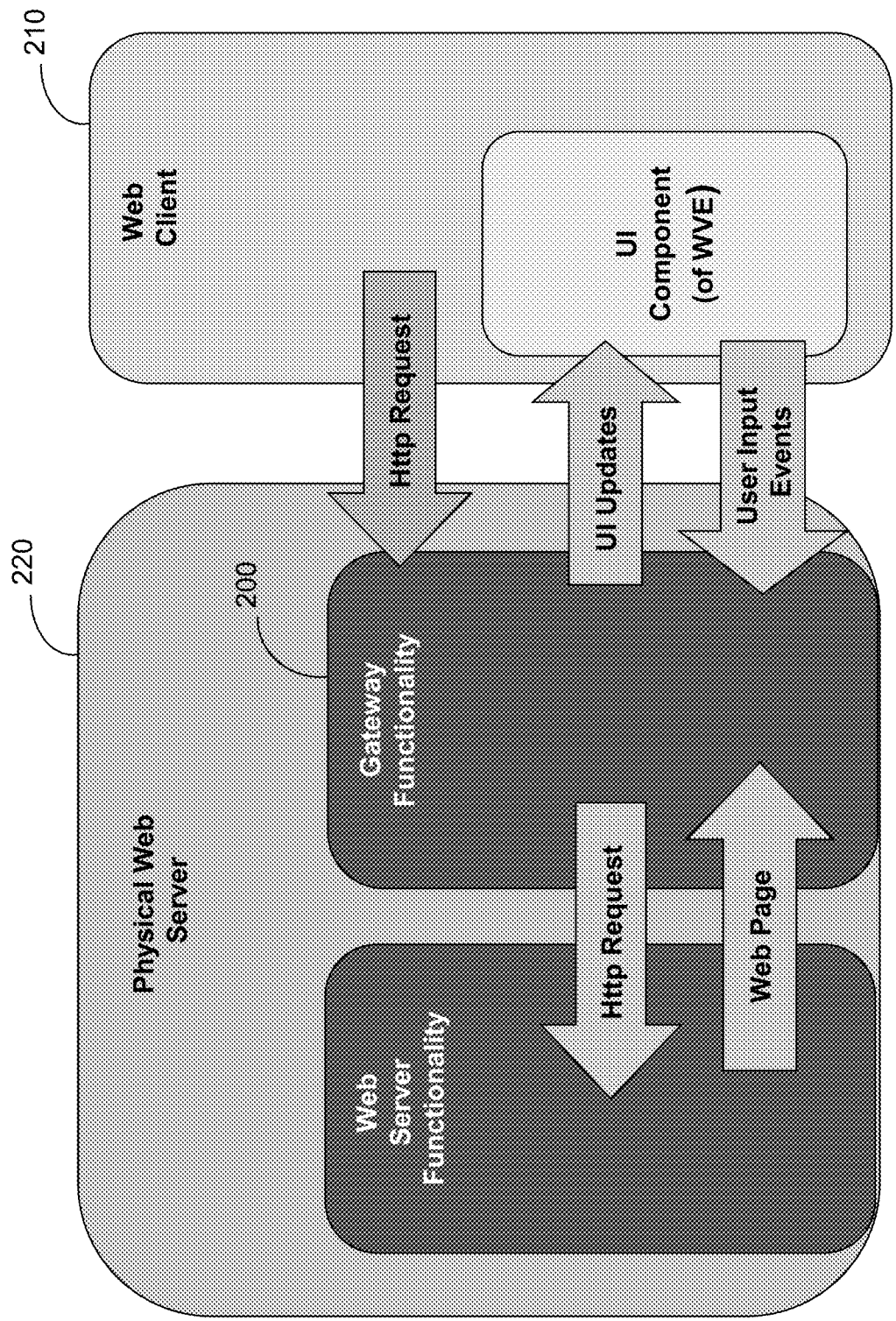
Figure 2G:
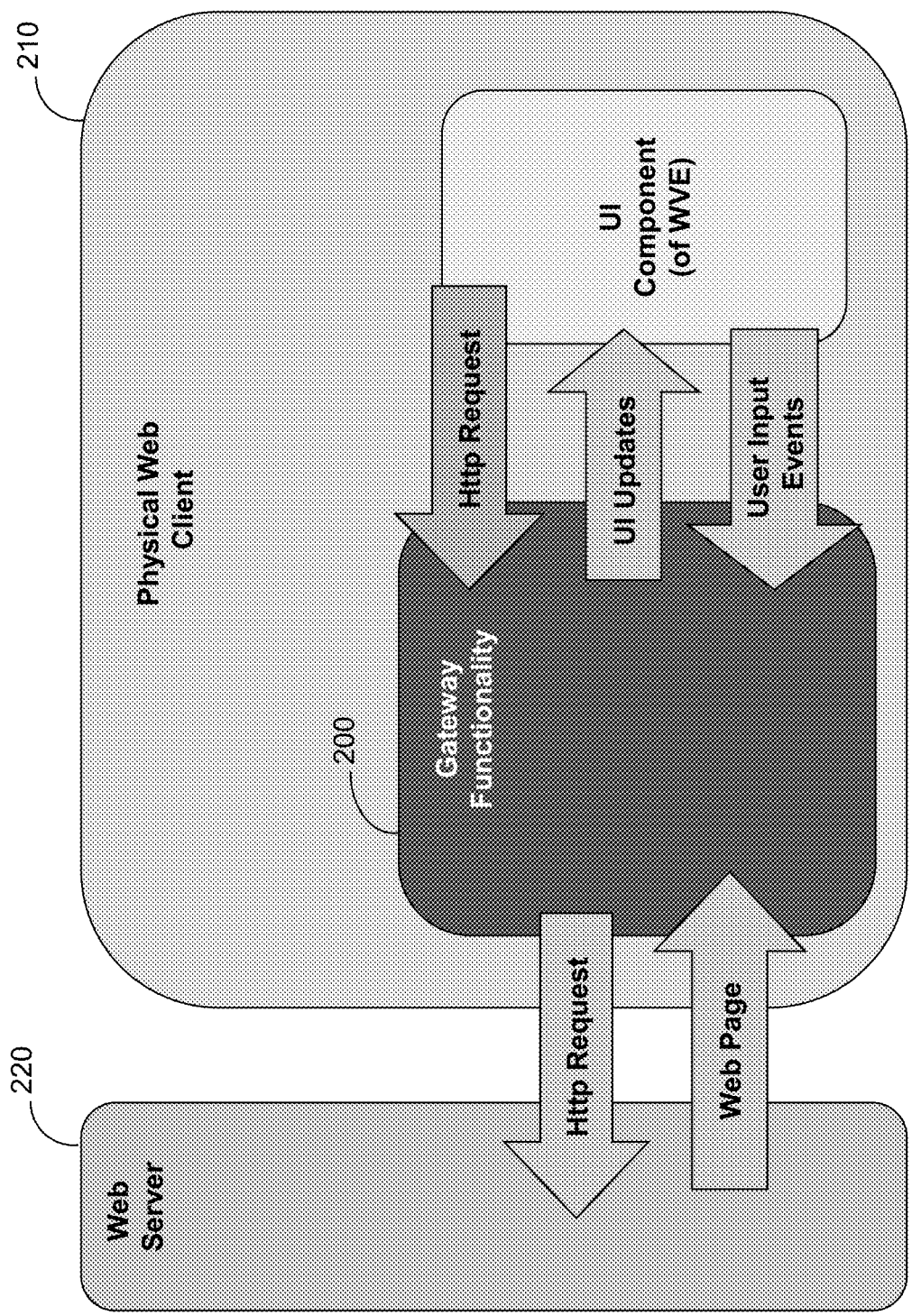

Another network deployment is depicted in FIG. 2F, in which the functionality of the gateway is embedded in the physical web server next to the original web server functionality. FIG. 2G shows another embodiment where the functionality of the secure gateway 200 is embedded in the web client 210. This embodiment provides only client protection.

Figure 3:
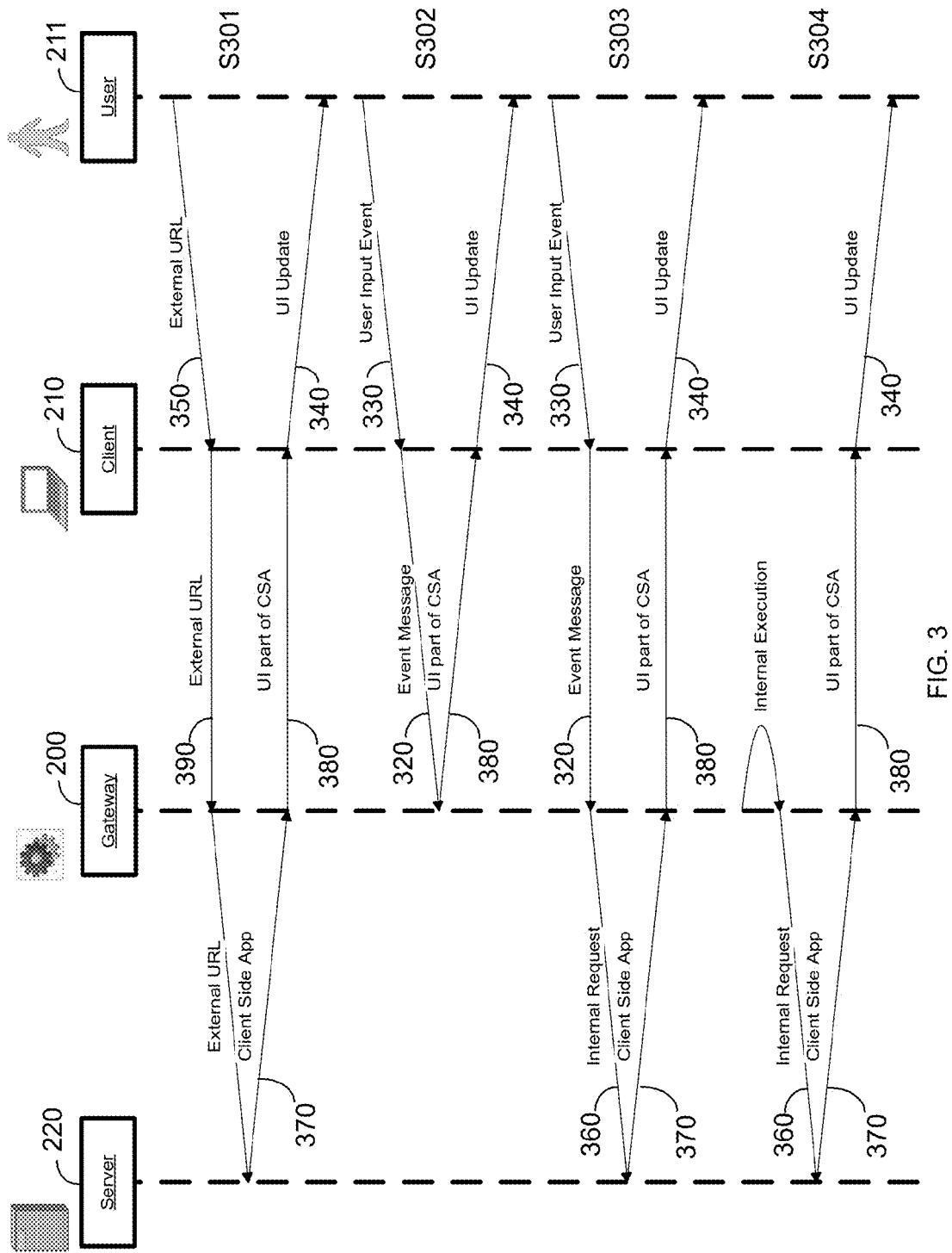
FIG. 3 is a diagram illustrating the operation of a secure gateway implemented in accordance with certain embodiments of the invention.

FIG. 3 shows a non-limiting diagram illustrating the operation of the secure gateway 200 in accordance with the principles of the present invention. As discussed above, the secure gateway 200 is deployed between the web client 210 and a web server 220. A user 211 of the client 210 receives data and generates inputs by means of using a user interface (UI). The secure gateway 200 separates, in real time, between execution and UI components of a client side application (CSA) code 370. The secure gateway 200 further executes the execution component in a sandbox, and generates a new CSA, consisting of UI components 380 of the original application, to be sent to the client 210. In addition to UI components of the original application, the UI part of CSA 380 includes minimal callback scripts generated by the secure gateway 200, which create and send event messages 320 upon receiving user input events 330.

Additionally, the UI part of CSA 380 includes minimal scripts generated by the secure gateway 200 to allow for asynchronous UI updates 380 to be sent by the secure gateway 200 to the client 210. In certain embodiments of the invention, the secure gateway 200 may also be adapted to block all internal and potentially harmful requests 360 originating from all sources external to the gateway 200 itself including, but not limited to, a server 220 and a client 210, and destined for a protected application. To allow users to return to previously visited internal URLs, the gateway 200 may maintain lists of requests previously made by clients.

In accordance with an embodiment of the invention, the client 210 is physically split into two distributed entities: an execution entity which is the gateway 200, and a UI entity which may be a web browser of the client 210. These entities communicate as part of the "web virtualization" session by transferring between them external URLs 390, event messages 320 which represent user input events 330, and updated UIs 380. Updated UIs 380 are generated by the execution component in the gateway 200 and sent to the client 210, possibly in the form of static HTML (i.e., HTML code which does not include original scripts), and displayed to the user as UI updates 340.

It should be emphasized that the gateway 200 operating in the scenario depicted in FIG. 3 does not need to segregate between legitimate and malicious internal requests 360 in order for the gateway 200 to protect web applications, nor does it need to segregate between legitimate and malicious CSAs 370 in order for it to protect web clients. The original client side application code is executed by the gateway 200 in a sealed and trusted environment. Even when the code is executed by the gateway 200 there is no change in the user's experience. That is, the functionality of the application as well as the look-and-feel are the same as if the application was executed using standard means.

In the diagram shown in FIG. 3, the protection process begins at S301, where the user 211 enters an external URL 350 which is forwarded, by the gateway 200, to the server 220. The server 220 responds with a client side application 370 (a new web page), which causes the gateway 200 to generate and send the UI part of CSA 380. The UI part is sent together with the minimal scripts generated by the gateway 200 used to handle user input events 330 and asynchronous UI updates 380, to the client 210 which updates the display on its browser.

At S302, the user 311 performs an action, which causes the client 210 to send an event message 320 to the gateway 200, where the action is executed. This action causes the display to change (without server intervention) through client side scripts executed by the gateway 200. This in turn causes the gateway 200 to send the client 210 a UI update 380. Consequently, the client 210 updates its user interface using UI updates 340. At S303, the user 310 performs an action that generates a user interface event 330. This action is forwarded by the client 210 to the gateway 200 by form of an event message 320. The action's execution causes an internal HTTP request 360 to be generated for either replacing the entire page, or an AJAX request. For example, this may be caused by executing client side code or by emulating a click on a link. The request 360 is sent to the server 220, which in turn replies with a CSA reply 370. The CSA reply 370 may be either a new client side application, or data to be processed by the client side application which made the AJAX request. Subsequently, if the action requires changing the user's 211 UI, a UI update 380 is generated by the gateway 200 and sent to the client 210, which is displayed to the user 211 by an updated UI 340.

At S304, a client side code is executed on the gateway 200, which causes an internal HTTP request 360 to be generated either for replacing the entire page or an AJAX request. The request 360 is sent to the server 220, which subsequently replies with a response 370 and causes UI updates 380 and 340 to be generated.

Figure 4:
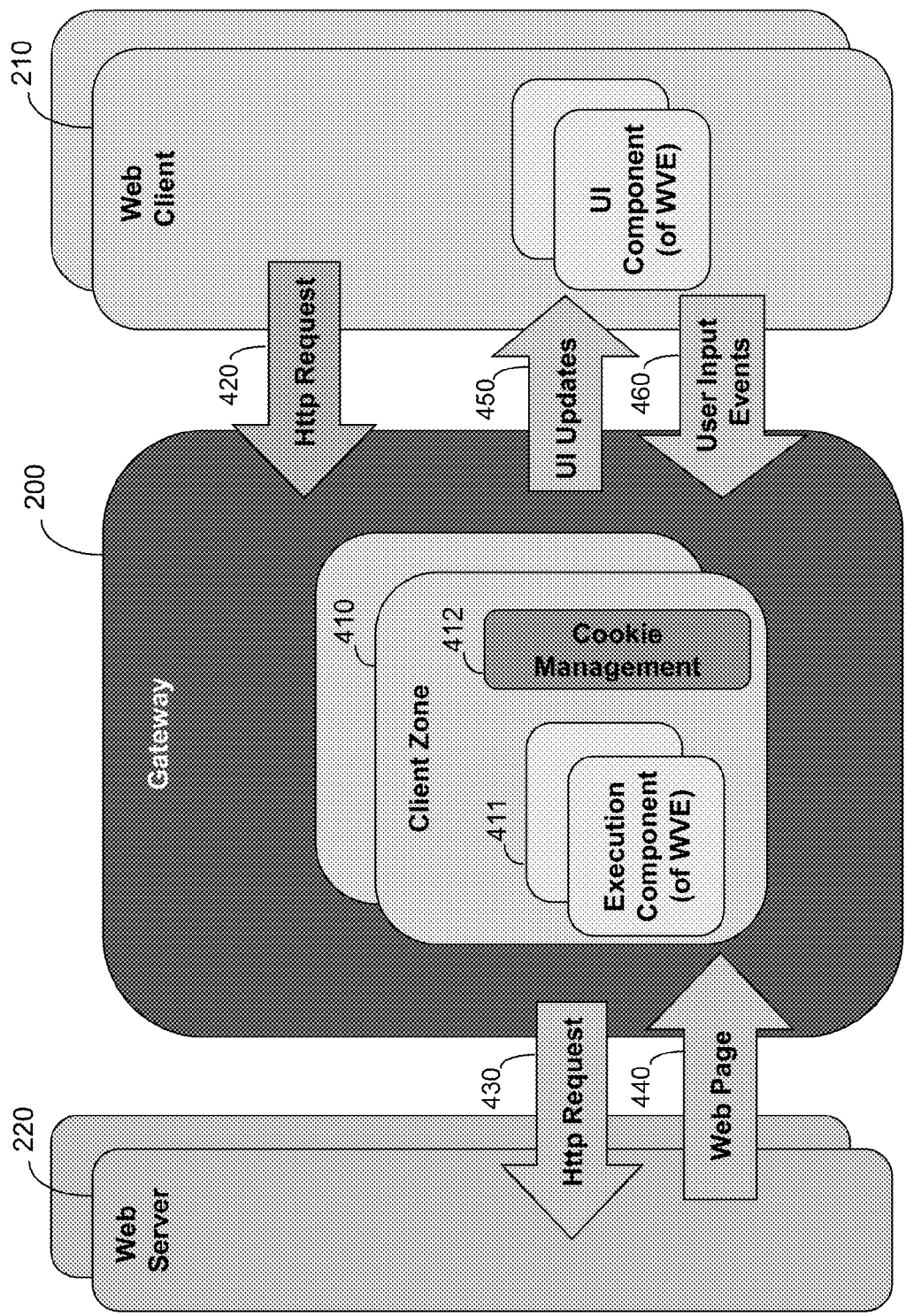
FIG. 4 is a block diagram of a secure gateway as constructed in accordance with an embodiment of the invention.

FIG. 4 depicts a non-limiting and exemplary block diagram of a gateway 200 implemented in accordance with one embodiment of the invention. The gateway 200 comprises a client zone 410 which handles the interface with the web client 210. A gateway 200 may include a plurality of client zones 410, each of which is assigned to a single web client. The client zone 410 includes an execution component 411 of a web virtualization engine (WVE) and a cookie manager 412. A WVE represents an active client-server session. A master cookie may be stored in the client 210 to maintain context between subsequent client-gateway sessions. A client may have several simultaneous WVEs active at a time, each of which may be either of a browser window or a tab opened on the client 210. A WVE may be initiated by an HTTP request generated by the client 210, or alternatively by a popup request made by another web virtualization engine.

A client HTTP request 420 may include a request for data in the form of an HTML page or media contents. The gateway 200 serves requests (i.e., relays requests to the web server 220) according to predefined policies. These policies may include for example: requests for an application not currently protected by the gateway should be allowed and forwarded to the server 220. In certain embodiments of the invention when the gateway 200 is deployed for the sole purpose of a web client protection, all requests fall under this policy.

A request that includes external URLs is a request that can be initiated by un-trusted parties external to the web application (e.g., user generated, links from other sites and applications). Harmless external URLs may include, for example, the root URL of the application. A list of external URLs may be generated, for example, by crawling the web application, starting at the root and following all accessible links. The gateway 200 generally relays such requests to both protected and unprotected applications.

Requests that include internal URLs are all requests generated by the client 210 and do not include external URLs as defined above. Specifically, an internal URL is used as part of an application's internal protocol and should not be requested by parties external to the application. In some cases such requests may not be in a URL format (e.g., AJAX requests can be in any protocol over HTTP or HTTPS). A request with an internal URL is allowed or denied according to stored attributes of the URL, and according to the target application. For example, the request may be allowed only if client 210 had previously visited the page indicated by this URL, or if the target application isn't protected by the gateway 200.

Once the gateway 200 decides to allow the request 420, a session is formed with the web server 220. Thereafter, the request 420 is forwarded by the gateway 200 to the web server 220. If the request 420 is denied, an error page is generated by the gateway 200 and returned to the client 210. Alternatively, a request for a legal URL may be generated.

The web server 220 receives a request 430 (corresponding to the request 420) from the gateway 200. Then, the server 220 responds with the appropriate web page 440. The page 440 includes both UI and execution sections, and its execution is emulated by the execution component 411. The emulation process includes, for example, loading of a document object model (DOM), executing appropriate scripts, manipulating relevant cookies, and so on. It should be emphasized that in order to perform this emulation, the gateway 200 keeps in the client zone 410 the context which is application and client specific. The emulation process also extracts relevant UI information which is later passed to the client 210 as UI updates 450. Generally, only UI information (e.g., in the form of static HTML) is passed to the client 210.

The client 210 sends the gateway 200 all relevant user input events 460 triggered by the user as part of her interaction with the user interface. The events 460 may include, but are not limited to, clicking on links and buttons, hovering over images, and filling in forms. If the user inputs events 460, or if any other tasks executed on the execution component 411 as part of the client side application execution trigger changes to the user interface, UI updates 450 are passed from the gateway 200 to the client 210.

The cookies manager 412 maintains user and session information in the form of cookies. Manipulation of cookies or any form of client side state data is performed by the execution component 411. Strict (albeit standard) security policies are enforced to prohibit a web application from accessing cookies stored by other applications or users. The execution component 411 also performs client authentication by, for example, having the gateway 200 send a client 210 a master cookie which securely identifies the client.

In certain execution scenarios if the client side application code, executed by the component 411, tries to send the web server 220 an HTTP request, the gateway 200 sends the request if at least one of the following conditions is satisfied: 1) the request is directed at the same web application or the same domain as the current one; 2) the current web application is "trusted" by the destination application; and 3) the request satisfies one of the predefined policies mentioned above. The notion of "trusted applications" is defined in order to allow for certain (trusted) applications to interact with protected applications by generating internal requests to them. This is useful, for example, if a certain enterprise has several applications on different domains which are allowed to interact by generating internal requests to each other. If the trust model allows unlimited communication between these applications, this poses no threat.

In certain embodiments of the invention the execution component 411 performs text field validation to protect the server 220 from harmful parameters embedded in user input events 460. The text field validation may be performed, for example, in one of the following two ways: 1) according to preconfigured default policies, e.g., blocking SQL queries or JavaScript code to be inputted by users; 2) according to specific configurations made per field in the application, e.g., blocking search queries larger than 1000 characters, but allowing for searches of SQL queries in search field number one.

In order for the gateway 200 to protect encrypted sessions, the gateway 200 terminates SSL sessions between the client 210 and server. The SSL termination can be achieved by using standard methods.

In one embodiment of the invention the gateway 200 records user actions on the web by logging user events and UI changes, thereby tracking users' behavior. In this embodiment the gateway 200 may include additional event handlers with the UI updates 450 generated for the client 210.

The secure gateway 200 has superior efficiency when the client 210 has a limited CPU power and memory, e.g., thin clients, mobile devices, and so on. The secure gateway 200 can offload the processing tasks from such clients, thereby providing better performance for the web applications.

As mentioned above, the WVE performs remote execution of web applications between the client 210 and gateway 200. In accordance with an embodiment of the invention, remote execution of applications which are based on DOM architecture, are disclosed. Such applications include, but are not limited to, DHTML web applications, Microsoft® WPF/Silverlight applications, and Adobe® Flex applications. The DOM is a high level representation layer which is in perfect correlation with the application's display. This layer may be binary or text (XML/HTML) based and acts as the interface between the application's execution and its user interface (UI).

In order to support remote execution for such applications in an efficient and generic manner, the DOM is synchronized between participating parties. In cases in which the DOM is encoded or precompiled in some manner, an additional procedure of reversing this encoding operation (partly or in full) may be needed before DOM synchronization as described below can take place.

Figure 5:
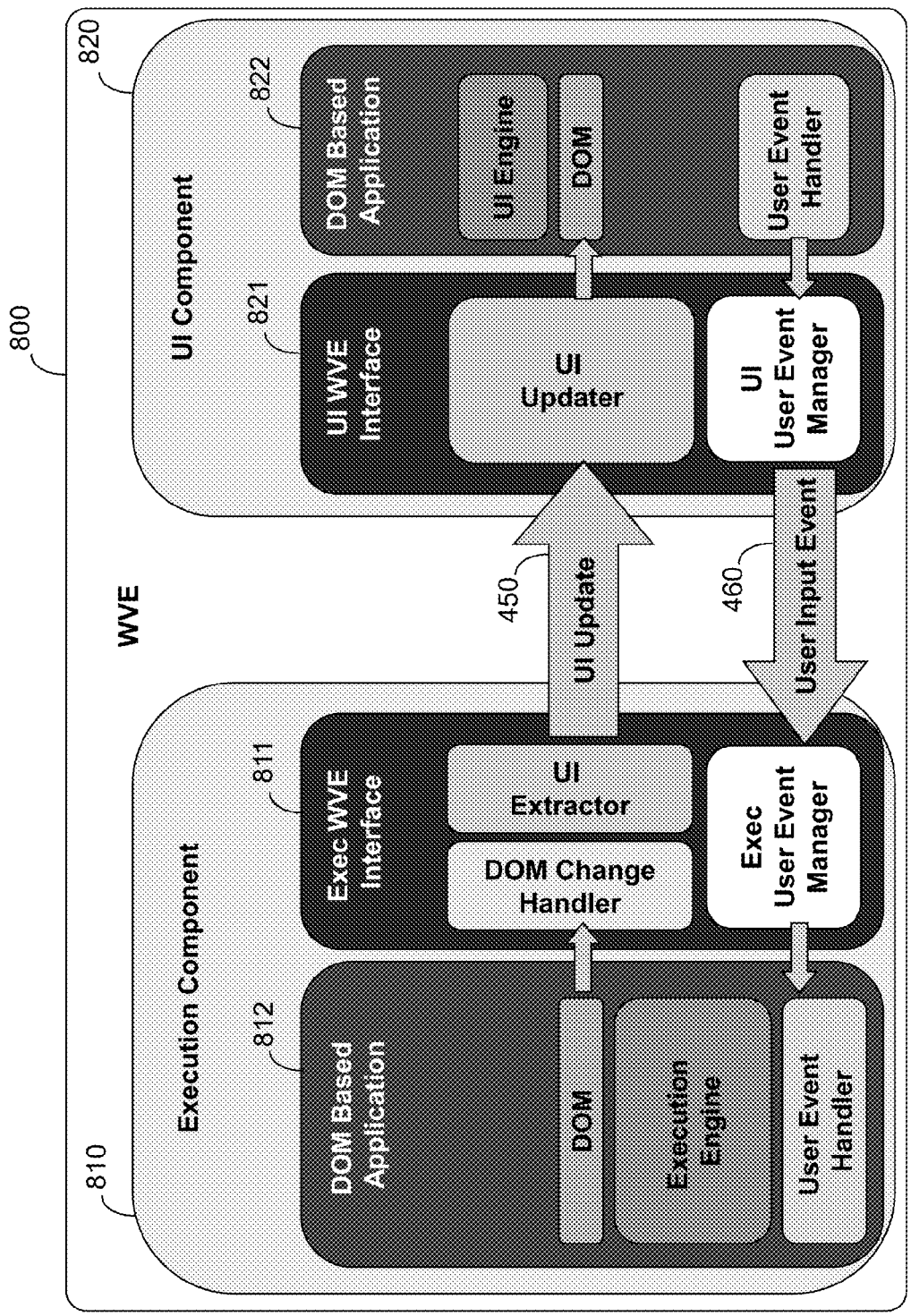
FIG. 5 is a block diagram illustrating a web virtualization engine implemented in accordance with certain embodiments of the invention.

FIG. 5 shows an exemplary and non-limited diagram of a WVE 800 implemented in accordance with an embodiment of the invention. The WVE 800 includes an execution component 810 installed at the gateway 200 and a UI component 820 included with the client 210. The execution component 810 includes an execution WVE interface 811 for interfacing with the UI component 820, for the purpose of sending UI updates 450 and invoking user events, using an event manager, upon reception of user input events 460 from the UI component 820. The execution WVE Interface 811, using a DOM Change Handler, notifies a UI extractor of DOM changes as they occur. The event manger, DOM Change Handler, and UI extractor are components of the WVE Interface 811.

The UI extractor keeps the display parts of the DOMs in both components 810 and 820 synchronized. The DOM is a hierarchical data object. This can be utilized to transmit only the part of the DOM that actually changed, for example, by identifying it with a unique key. DOM segments may be updated at the element (node in hierarchy) and even attribute (descriptor of specific node) levels. Protocol commands can match local DOM manipulation commands such as add-child, remove-child, change-attribute and change-text.

Not all elements of the DOM are visible to the user. This can be utilized to pass additional useful metadata (e.g., unique key mentioned above, as well as information regarding what user actions must be relayed back to the execution component) inside the DOM itself. Event handlers can also be changed by the application during execution, and they will be sent to the UI component 820 as they are generated. Non-displayable parts of the original DOM (e.g., scripts, comments, and so on) are not passed to the UI component 820. Furthermore, many of the DOM attributes are dynamic in nature. They are manipulated by the execution engine, in the DOM based application 812, and passed to the missing UI engine, DOM based application 812, by memory resident data structures. These attributes must also be serialized into the static document tree sent to the UI component 820, in order for the UI engine, DOM based application 822, to display them.

The execution user event manager validates and simulates a user input event 460 received from the UI component 820. If such an action, either directly or not, causes the DOM to change, this will be dealt with the same as with all other DOM changes. In addition to actual user initiated events, UI related attributes will also be passed back from the UI component 820.

An UI WVE interface 821 includes a UI user event manager and UI updater and is responsible for sending to the execution component 810 relevant user input events 460, and updating the local DOM upon reception of UI updates 450. The UI updater receives the UI updates 450 and updates the current DOM accordingly. Upon every change in the visible parts of the DOM, the application's UI engine updates the display visible to the user. The UI user event manager is notified on the user actions it should relay back. It listens in on events for these actions and sends them to the execution component as needed. In some cases certain events may cause the omission of previous events to be acceptable (e.g., best effort handling of fast movements of the mouse may sometimes be adequate). In such cases the UI user event manager and/or the execution user event manager may decide to omit certain events accordingly, due to performance and/or other considerations. The UI component 820 also supplies the execution component 810 with UI related attributes needed by the execution engine.

The following example illustrates one possible implementation of the WVE 800 in accordance with an embodiment of the invention. The execution component 810 (and specifically the DOM change handler within it) listens to an event indicating the loading of a new HTML document. While a new document is being loaded, the execution component 810 (specifically the UI extractor) serializes the document and sends it to the UI component 820. The serialization process includes extracting UI information from the original client side application, and is performed in real time as the page is downloaded from the web server. The serialized version may be sent incrementally as it is generated, in order to reduce delay to a minimum.

Upon loading of a page, the UI extractor can add a unique identifier (uid) to each HTML element on the page using, for example, an element's Expando feature. For example, the element <body> may be transformed into <body uid="4">. Setting unique IDs allows the execution and UI components 810 and 820 to communicate only the elements in need of updating, referring to them according to their unique ID. Frame elements may have an additional id, in order to allow the referral to a specific document on the page. For example, the element <frame> may be transformed into <frame uid="19" frameUid="2">. The serialization of inner documents (or frames) can be conducted in a recursive manner when scanning the DOM. Each root document (which represents a window or tab on the client machine, and is represented by a separate WVE) may also have a window ID unique in the context of that specific client. In all, the ID hierarchy may include client, window, frame and element.

In addition to assigning the unique ids, the execution component 810 begins listening on change events for every element on the HTML documents. This includes both changes in attributes of specific elements (e.g., attribute added, attribute removed and attribute changed), and changes in the DOM structure itself, including the addition and removal of elements and text nodes. Once one of the elements changes, it will be re-serialized and sent to the UI component 820 if needed. If a text node changes, it can be identified using its sibling elements or its parent element. If attributes or event handlers change, they can be identified by the element number which contains them and their name.

As an example of serialization concepts applicable to both the serialization of the entire initial document and to the serialization of specific elements when updated, serialization in HTML is herein described. This does not mean that the HTML page is passed "as is", but it does mean that the resulting serialized documents and elements will have a legal HTML form. This makes the de-serialization of such documents by the UI component 820 simple.

In general, only the static visual parts of the HTML documents may be passed, leaving out all of the original scripts and references to such scripts. All links on the page must also be transformed, since links should be "clicked" as part of the application's execution in the execution component 810. In addition, the UI component 820 is notified about which user events interest the execution component 810.

Following are several examples illustrating the serialization of specific elements. An element such as <script type="text/javascript"> may be completely omitted from the serialized document. If the application contains VBScript elements or scripts in any other programming language, they may be omitted as well. Comments will also be omitted.

An element such as <link rel="Stylesheet" type="text/css" href="style.css"/> may be transformed into the actual style sheet. For example it may look like <style uid="1">#firstDiv{COLOR: yellow}.green-text{COLOR: green</style> after serialization.

Button elements with javascript actions attached to them such as <button name="btnPing" ID="btnPing" onclick="pingOnClick( )">Send</button> can be serialized into <button uid="9" name="btnPing" id="btnPing" onclick="handleEvent( )">Send</button>. The reference to the java-script function was changed, because the original function was removed as part of the serialization. Instead, a call to handleEvent( ) will be made to inform the execution component 810 that the user attempted such an action. handleEvent( ) may be defined in the following manner as part of the <head> element of the serialized document: <script type="text/jscript"> function handleEvent( ) {window.appShare.handleGuestEvent(event.srcElement.uid, event.type); }</script> where window.appShare.handleGuestEvent is a function which relays the information back to the execution component 810 via Ajax.

The same handleEvent( ) function may be used to send link actions back to the execution component 810. For example, an element such as <a id="firstlink" hRef="www.renenhallak.com">renenhallak</a> can be serialized to <a uid="5" id="firstlink" href="www.renenhallak.com" onclick="handleEvent( ) return false;">renenhallak</a>. The execution component 810 can understand the intended destination frame & window of the link, and if a new window (and subsequently a new WVE) must be opened, it will proceed according to defined policies. In order that the address bar on the client's browser show the correct URL as the user browses between different pages, the execution component 810 may instruct the UI component 820 to make an HTTP request which will cause the entire page to be replaced. In certain embodiments of the invention in which certain user HTTP requests are blocked, the execution component 810 must allow such requests that it has instructed the UI component 820 to make.

Forms require specialized serialization as well. Form input elements such as text boxes and radio buttons are often changed by the user. Subsequently, form information is submitted by the client to the server upon initiating the form submit action (usually by clicking a submit button), or cleared back to default values upon initiating the reset action. To make sure the execution component 810 has updated information before trying to submit the form, an "on Change" event has been added to each form input element. For example, an element such as <input type="text" name="username"/> can be serialized to <input uid="6" type="text" name="username" onchange="handleEvent( )"/>. To ensure that the client does not attempt to submit the form to the server on their own, and in order to have the execution component aware of form resets, a form element can be changed from <form name="input" action="html_form_submit.asp" method="get"> to <form uid="7" name="input" action="html_form_submit.asp" method="get" onsubmit="handleEvent( )" onreset="handleEvent( )">. The execution component 810 will receive these events and perform the appropriate actions. Also, the execution component may change form field values, which should be relayed as display updates 450 to the UI component 820.

It should be noted that elements such as <object> and <applet> which may include proprietary uses of the display and user events, should be serialized separately according to their underlying technology. For example, flash animations should be serialized as part of the serialization of flash objects, if applicable.

Different browsers render HTML pages differently, thus the server 220 may respond with slightly different client side applications code according to the type of browser on the requesting client 210. In order for the UI to render as intended on the client's browser, the execution component 810 may impersonate the client's browser type when interacting with the server 220. Furthermore, different browsers may handle JavaScript calls differently. For example, the DOM manipulation addChild function may have different names on different browsers and the function getNextSibling may in one browser skip over comment nodes and in another return comment nodes. The execution component 810 must make sure that the execution engine it runs and its interface to the DOM and to the User Event Handler are compliant with the browser type it is impersonating.

Additional information such as the JavaScript generated by the gateway 200, which is used to update the display and to send the execution component 810 relevant user events may also be included upon the initial sending of a new (root)

document. In order for the page to appear to the user as if it arrived from the original source, an outer frame may be utilized which includes a full window inner frame generated by the gateway itself. This will allow the address bar to show the original URL. Additionally, it will allow AJAX communication with the gateway since the inner frame may come from the gateway's domain. In a case where the original document contains frames, this is in fact a hierarchy of documents. Starting from the base of the hierarchy tree, each frame (document) can be serialized and sent separately. All of these sub frames may arrive from the same domain and thus will be able to communicate with each other in javascript when the need arises to send a user event to the execution component 810 or to update part of the display. Each document may have a frameUid which corresponds to the frameUid attribute on a <frame> or <frame> tag on its parent document. The topmost document can have a frameUid of zero. Whenever a certain element or sub-tree of the DOM changes, that specific element will be re-serialized and sent to the UI component 820. Information outside the scope of the web page, such as status bar text, may also be passed to the UI component 820 upon change events.

The User Event Handler in the DOM based application 822, via the UI user event manager, sends all relevant user generated events to the execution component 810. The user input event 460 sent, includes both the unique ID of the element the event happened on, and the event type (e.g., mouse click, mouse over, etc.). The execution component 810, upon reception of such an event, validates it and fires the appropriate event on the correct element. In addition, rendering information needed by the execution engine running in the execution component 810 will be sent from the UI component 820 as part of the DOM synchronization. Such attributes as screen size and element location in the window for example, are generated by the UI and can be used by the execution. In this sense DOM synchronization is bidirectional.

The UI WVE Interface 821 can be implemented entirely in JavaScript, requiring no installation on the client machine. Client triggered communication can be sent via Ajax. An Ajax request may be left open to allow for gateway 200 initiated updates. As the serialization process keeps all information in HTML, the de-serialization of full documents can be performed by loading the serialized document "as is" either as the top level document or under its respective frame. When a specific element has been updated, the DOM can be scanned to find that element according to its unique ID, and replace its HTML with the updated serialization received. The scanning process may be performed quite efficiently using methods which may include some preprocessing to allocate elements quickly. For some elements, the application may change specific attributes (e.g., styling attribute, such as changing color, font or size of a text, or changing the visibility of a block to hidden). In such cases, the update message may contain the name of the attribute alongside the unique ID of the element. For changes of text in between elements, it can be found using the ID of elements before or after the text that has changed. In cases of removal or insertion of elements in the DOM hierarchy, the element's parent and sibling IDs may be used to indicate its position.

To allow for the use of persistent client side state in the form of cookies, the client's cookies should be stored in a place accessible to the machine running the execution component. To efficiently implement policies and restrictions (e.g., one client's WVE cannot access another client's cookies, cookies from one domain cannot be accessed by an application running on a different domain, quota enforcement on size of cookies per user, and so on) it may be convenient to store cookies in a database. The use of client cookies requires some form of client identification. This may be performed using a master cookie generated and kept up to date by the execution component 810 and stored in the UI component 820. In cases where user identification is possible (e.g. by username and password), users are able to use different clients 210 and still utilize the cookies stored for them by the execution component 810.

The teachings of the secure gateways and methods described herein can protect against a plurality of currently known web attacks. Such web attacks include, but are not limited to, Buffer Overflow Exploits, CGI-BIN Parameter Manipulation, Form/Hidden Field Manipulation, Cookie/Session Poisoning, Cross-Site Scripting (XSS), Command Injection, SQL Injection, Error Triggering Sensitive Information Leaks, Insecure Use of Crypto, Back Doors and Debug Options, Well-known Platform Vulnerabilities, Spyware, Malware, Browser Exploit, Zero-Day Exploits, and the like. In addition, one with ordinary skill in the art can adapt the teachings of the invention to detect and block new versions of the web attacks, listed herein and/or new types of web attacks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. One of ordinary skill in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What I claim is:

1. A method for securing a web client against malicious web attacks, the method is performed by a secure gateway deployed between a web client and a web server, comprising:

receiving a uniform resource locator (URL) request from the web client;

sending the URL request to the web server for executing server side web application code responsive to the URL request;

receiving client side application code from the web server;

executing, by the secure gateway, the client side application code on behalf of the web client based in part on user events received from the web client, wherein the execution of the client side application code further includes synchronizing changes made in a document object model (DOM) in the secure gateway to a DOM in the web client, wherein no harmful client side application code is processed by the web client and no changes in the DOM that can harm the web client are synchronized with the web client; and sending to the web client user interface updates rendered responsive to the execution of the client side application code, wherein the user interface updates are serialized for extracting user interface information from the client side application code, wherein the serialization is performed in real time as a new web page is downloaded from the web server.

2. The method of claim 1, further comprising:
receiving user input events from the web client;
validating the user input events;
emulating the user input events in accordance with client side application code; and
sending to the web server requests generated by the execution of the client side application code.

3. The method of claim 1, wherein traffic data between the web client and the secure gateway is transferred by means of a secured protocol.

4. The method of claim 1, wherein URL requests received from the web client are relayed to the web server only when the URL requests do not include internal URLs.

5. The method of claim 1, wherein the client side application code includes at least execution part and user interface (UI) part, wherein the execution part is processed by the secure gateway and the UI part is sent to the web client.

6. The method of claim 4, wherein the web attack comprise buffer overflow exploits, cgi-bin parameter manipulation, form/hidden field manipulation, cookie/session poisoning, broken passwords, cross-site scripting (XSS), command injection, structured query language (SQL) injection, error triggering sensitive information leaks, insecure use of crypto, back doors and debug options, well-known platform vulnerabilities, spyware, malware, browser exploit, and zero-day exploits.

7. The method of claim 1, is executed by computer executable code stored in a non-transitory computer readable medium.

8. A secure gateway for securing a web client against malicious web attacks, the secure gateway is deployed between a web client and a web server, comprising: a processor for executing computer-executable instructions; a memory storing the instructions, accessible to the processor; at least one client zone for executing client application side code of a web application on behalf of the web client, wherein the at least one client zone includes an execution component and a cookies manager for remotely storing cookies of the web client, wherein the at least one client zone is further configured to execute the client side application code based in part on user events received from the web client, wherein the execution of the client side application code further includes synchronizing changes made in a document object model (DOM) in the at least one client zone to a DOM in the web client, Wherein no harmful client side application code is processed by the web client and no changes in the DOM that can harm the web client are synchronized with the web client, wherein the at least one client zone is further configured to send to the web client user interface updates rendered responsive to the execution of the client side application code, wherein the user interface updates are serialized for extracting user interface information from the client side application code, wherein the serialization is performed in real time as a new web page is downloaded from the web server.

9. The secure gateway of claim 8, wherein executing the client side application code further comprising:
receiving a uniform resource locator (URL) request from the web client;
sending the URL request to the web server for executing server side web application code responsive to the URL request;
receiving client side application code from the web server; and
executing the client side application code on behalf of the web client.

10. The secure gateway of claim 9, further comprising:
receiving user input events from the web client;
validating the user input events;
emulating the user input events according to the client side application code; and
sending to the web server requests generated by the execution of the client side application code.

11. The secure gateway of claim 9, wherein traffic data between the web client and the secure gateway is transferred by means of a secured protocol.

12. The secure gateway of claim 9, wherein URL requests received from the web client are relayed to the web server when the URL requests do not include internal URLs.

13. The secure gateway of claim 9, wherein the client side application code includes at least execution part and user interface (UI) part, wherein the execution part is processed by the secure gateway and the UI part is sent to the web client.

14. A web virtualization engine for remotely executing web applications, comprising: a processor for executing computer-executable instructions; a memory storing the instructions, accessible to the processor; an execution component for executing client application side code of a web application on behalf of a web client based in part on user events received from the web client, wherein the execution of the client application side code further includes synchronizing changes made in a document object model (DOM) in the secure gateway to a DOM in the web client, wherein no harmful client application side code is processed by the web client and no changes in the DOM that can harm the web client are synchronized with the web client, the execution component is further configured to render user interface updates responsive to the execution of client application side code, wherein the user updates are serialized for extracting user interface information from the client side application code, the serialization is performed by the execution component in real time as the page is downloaded from the web server, wherein the execution component is operable in a secure gateway deployed between the web client and a web server; and a user interface component for generating user interface content for the web client based on user interface updates received from the execution component, wherein the user interface component is operable in the web client.

15. The web virtualization engine of claim 14, wherein the user interface updates do not include at least one of: original scripts and comments.

* * * * *